United States Patent
Yamazaki

(10) Patent No.: US 7,907,806 B2
(45) Date of Patent: Mar. 15, 2011

(54) OPTICAL MIXER

(75) Inventor: Hiroyuki Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/814,605

(22) Filed: Jun. 14, 2010

(65) Prior Publication Data

US 2011/0019961 A1    Jan. 27, 2011

(30) Foreign Application Priority Data

Jul. 21, 2009    (JP) ................................. 2009-170177

(51) Int. Cl.
  *G02B 6/12*    (2006.01)
  *G02B 6/26*    (2006.01)
  *G02F 1/03*    (2006.01)
  *G02F 1/07*    (2006.01)
  *H04B 10/06*    (2006.01)

(52) U.S. Cl. ............... 385/39; 385/14; 385/15; 359/245; 398/204; 398/214

(58) Field of Classification Search ..................... 385/39
  See application file for complete search history.

(56) References Cited

U.S. PATENT DOCUMENTS 7,397,979 B2 *   7/2008   Shpantzer et al. .............. 385/14
7,613,403 B2 *   11/2009  Hironishi et al. ............. 398/205

FOREIGN PATENT DOCUMENTS

JP    2002122895 A    4/2002
JP    2008193555 A    8/2008

* cited by examiner

*Primary Examiner* — Uyen-Chau N Le
*Assistant Examiner* — Chris H Chu

(57) ABSTRACT

When a waveguide of second signal light outputted from a first optical coupler intersects a waveguide of first local light outputted from a second optical coupler, a waveguide of a first signal light outputted from the first optical coupler and a waveguide of a second local light outputted from the second optical coupler are each provided with a loss compensation intersecting waveguide that compensates for loss that occurs when the waveguide of the second signal light outputted from the first optical coupler intersects the waveguide of the first local light outputted from the second optical coupler.

2 Claims, 1 Drawing Sheet

OPTICAL MIXER

This application is based upon and claims the benefit of priority from Japanese Patent Application No. 2009-170177 filed on Jul. 21, 2009, the content of which is incorporated by reference.

BACKGROUND OF THE INVENTION

1. Field of the Invention

The present invention relates to an optical mixer used for an optical communication system, and more particularly, to a technique for compensating for loss that occurs when waveguides intersect each other.

2. Description of the Related Art

With the increase in transmission rates of optical communication systems, communication systems capable of realizing higher capacity, more efficient and faster communications are actively under review (e.g., JP2008-193555A). Among such communication systems, DP-QPSK (Dual-polarization Quadra phase shift keying) has been adopted as the favorite for 100GE transmitting apparatuses.

FIG. 1 is a diagram illustrating an example of a 90° hybrid interferometer, which is a general optical mixer used for an optical communication system.

As shown in FIG. 1, the 90° hybrid interferometer in this example has a feature in which an optical path length of a waveguide outputted from an upper optical coupler of two optical couplers 120 and connected to optical coupler 130$b$ is shifted by $\pi/2$ from the other waveguide of the interferometer to which a TE signal is inputted. Furthermore, the 90° hybrid interferometer has another feature in which lengths of waveguides outputted from optical coupler 110$a$ and connected to optical couplers 130$a$ and 130$b$ are equal. The same applies to the interferometer that processes a TM signal, and an optical path length of a waveguide outputted from optical coupler 120 and connected to optical coupler 130$c$ is configured to be shifted by $\pi/2$ from the other waveguide of the interferometer to which the TM signal is inputted. Here, the waveguide outputted from optical coupler 120 and inputted to optical coupler 130$a$ is configured to intersect the waveguide outputted from optical coupler 110$a$ and connected to optical coupler 130$b$ at waveguide intersection 140. The same applies to the interferometer that processes the TM signal.

When the 90° hybrid interferometer configured as shown above is used, upon receiving a DP-QPSK signal, 100GE converts output of the 90° hybrid interferometer and eight PD outputs from the 90° hybrid interferometer to digital signals through AD conversion. The signal light is divided into two portions; TE signal and TM signal, which are inputted to the 90° hybrid interferometer independently of each other and which are made to interfere with local light. There is such a feature in which it is possible to compensate for signal degradation generated by wavelength dispersion or polarized mode dispersion by carrying out DSP processing on the digital signals without using any dispersion compensation fiber.

With regard to the 100GE scheme, discussions on various types of MSA are currently underway. One such example is MSA implementation of a receiving module and studies are underway for introducing a polarization beam splitter, 90° hybrid interferometer, eight PDs and TIA into a small casing of 75 mm×35 mm.

The aforementioned 90° hybrid interferometer requires two types of waveguide; a waveguide connected from optical coupler 110$a$ to optical coupler 130$a$ and a waveguide connected from optical coupler 110$a$ to optical coupler 130$b$ whose arm lengths are equalized, and a waveguide connected from optical coupler 120 to optical coupler 130$b$ having a difference in arm length of $\pi/2$. Furthermore, with regard to PD outputs, there are waveguide intersections 140 where the waveguide of the TE signal which is branched and outputted by optical coupler 110$a$ intersects the waveguide of the local light outputted from optical coupler 120, and the waveguide of the TM signal which is branched and outputted by optical coupler 110$b$ intersects the waveguide of the local light outputted from optical coupler 120. When there are such waveguide intersections 140 where waveguides intersect each other, intersection loss occurs in one of the waveguides making up the interferometer, which may cause an extinction ratio to degrade. Loss that occurs in an intersecting waveguide is normally on the order of 0.1 to 0.2 dB. When light decreases by 0.2 dB on one arm, the extinction ratio of the interferometer degrades down to the order of a maximum of 13.5 dB. To avoid such degradation and maintain a high extinction ratio of the interferometer, a setting needs to be made such that loss values on both arms are equal.

Here, a technique is conceived whereby one of two waveguides of different optical path lengths is provided with optical path length/loss adjusting means for compensating for loss produced by the difference in optical path length (e.g., JP2002-122895A).

However, the technique whereby one of two waveguides of different optical path lengths is provided with optical path length/loss adjusting means to thereby compensate for loss produced by the difference in optical path length can compensate for loss caused by the difference in optical path length, but there is a problem in which the above described loss caused by the waveguides intersecting each other cannot be compensated.

SUMMARY OF THE INVENTION

It is an object of the present invention to provide an optical mixer capable of compensating for loss that occurs when waveguides intersect each other.

In order to attain the above described object, the present invention is an optical mixer including a first optical coupler that receives signal light, branches the signal light and outputs first and second signal light, a second optical coupler that receives local light, branches the local light and outputs first and second local light, a third optical coupler that couples the first signal light outputted from the first optical coupler with the first local light outputted from the second optical coupler and outputs the coupled light, and a fourth coupler that couples the second signal light outputted from the first optical coupler with the second local light outputted from the second optical coupler and outputs the coupled light, at least one of waveguide lengths of the first and second signal light and waveguide lengths of the first and second local light being longer or shorter than other waveguide lengths by $\pi/2$ and the waveguide from the first optical coupler to the fourth optical coupler intersecting the waveguide from the second optical coupler to the third optical coupler, wherein the waveguide from the first optical coupler to the third optical coupler and the waveguide from the second optical coupler to the fourth optical coupler are each provided with loss compensating means for compensating for loss that occurs when the waveguide from the first optical coupler to the fourth optical coupler intersects the waveguide from the second optical coupler to the third optical coupler.

The present invention adopts a configuration of an optical mixer with two waveguides intersecting each other, in which waveguides not intersecting each other include loss compensating means for compensating for loss that occurs when the two waveguides intersect each other, and can thereby compensate for loss that occurs when the waveguides intersect each other in the optical mixer having two waveguides that intersect each other and realize a high extinction ratio. This makes it possible to realize DP-QPSK demodulation processing of high quality at a high extinction ratio.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Hereinafter, an exemplary embodiment of the present invention will be described with reference to the accompanying drawings.

Figure 1:
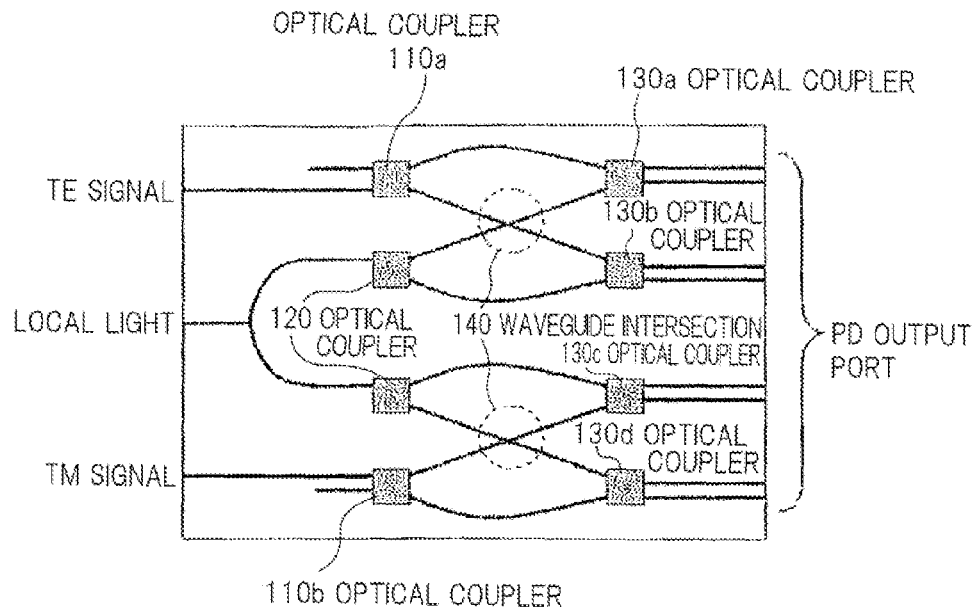
FIG. 1 is a diagram illustrating an example of a 90° hybrid interferometer, which is a general optical mixer used for an optical communication system.
Figure 2:
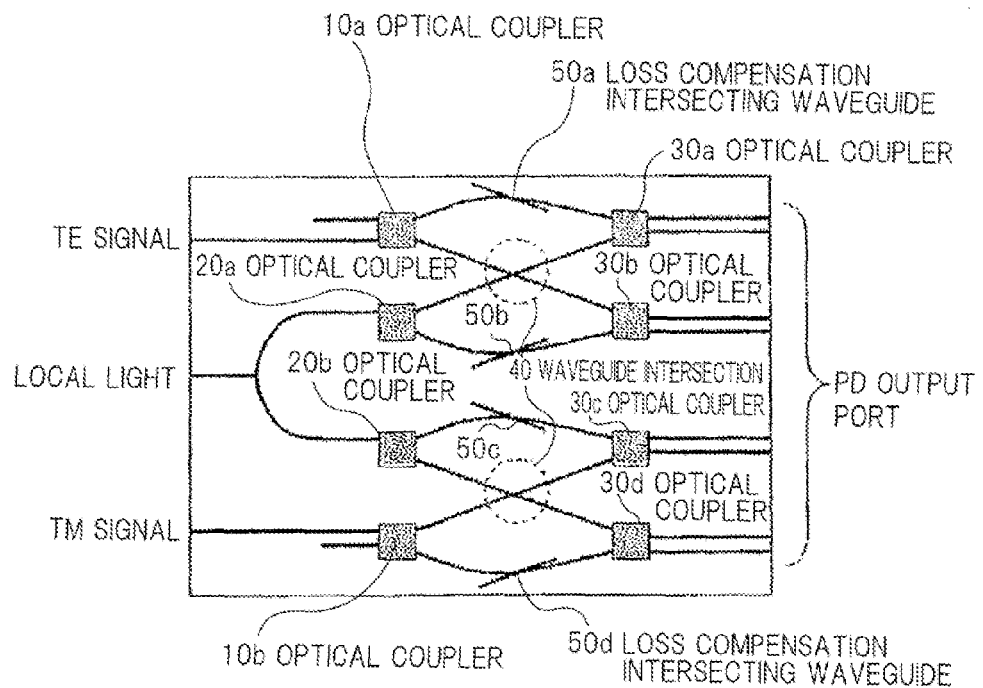
FIG. 2 is a diagram illustrating an exemplary embodiment of an optical mixer of the present invention.

FIG. 2 is a diagram illustrating an exemplary embodiment of an optical mixer of the present invention.

As shown in FIG. 2, the present exemplary embodiment is a 90° hybrid interferometer configured by including optical couplers 10a, 10b, 20a and 20b, optical couplers 30a to 30d provided in two stages on waveguides of a TE signal, local light and TM signal inputted and loss compensation intersecting waveguides 50a to 50d, which are loss compensating means provided on waveguides between optical couplers 10a, 10b, 20a and 20b, and optical couplers 30a to 30d.

Optical coupler 10a is a first optical coupler, constitutes an equal arm-length MZI interferometer, receives a TE signal which serves as signal light, branches the inputted TE signal and outputs a first TE signal and a second TE signal.

Optical coupler 10b is a first optical coupler, constitutes an equal arm-length MZI interferometer, receives a TM signal which serves as signal light, branches the inputted TM signal and outputs a first TM signal and a second TM signal.

Optical couplers 20a and 20b are second optical couplers, receive local light, branch the inputted local light and output first and second local light respectively. Optical couplers 20a and 20b are made up of an asymmetric MZI, one arm length of which is longer by π/2.

Loss compensation intersecting waveguide 50a is provided on a waveguide of the first TE signal outputted from optical coupler 10a, that is, on a waveguide from optical coupler 10a to optical coupler 30a.

Loss compensation intersecting waveguide 50b is provided on a waveguide of the second local light outputted from optical coupler 20a, that is, on a waveguide from optical coupler 20a to optical coupler 30b.

Loss compensation intersecting waveguide 50c is provided on a waveguide of the second local light outputted from optical coupler 20b, that is, on a waveguide from optical coupler 20b to optical coupler 30c.

Loss compensation intersecting waveguide 50d is provided on a waveguide of the first TE signal outputted from optical coupler 10b, that is, on a waveguide from optical coupler 10b to optical coupler 30d.

Optical coupler 30a is a third optical coupler and couples the first TE signal outputted from optical coupler 10a and the first local light outputted from optical coupler 20a and outputs the coupled signal to a PD output port.

Optical coupler 30b is a fourth optical coupler and couples the second TE signal outputted from optical coupler 10a and the second local light outputted from optical coupler 20a and outputs the coupled signal to the PD output port.

Optical coupler 30c is a fourth optical coupler and couples the second TM signal outputted from optical coupler 10b and the second local light outputted from optical coupler 20b and outputs the coupled signal to the PD output port.

Optical coupler 30d is a third optical coupler and couples the first TM signal outputted from optical coupler 10b and the first local light outputted from optical coupler 20b and outputs the coupled signal to the PD output port.

Furthermore, there is waveguide intersection 40 where a waveguide of the second TE signal outputted from optical coupler 10a, that is, a waveguide from optical coupler 10a to optical coupler 30b and a waveguide of the first local light outputted from optical coupler 20a, that is, a waveguide from optical coupler 20a to optical coupler 30a intersect each other. Furthermore, there is waveguide intersection 40 where a waveguide of the second TM signal outputted from optical coupler 10b, that is, a waveguide from optical coupler 10b to optical coupler 30c and a waveguide of the first local light outputted from optical coupler 20b, that is, a waveguide from optical coupler 20b to optical coupler 30d intersect each other.

Hereinafter, operations of the 90° hybrid interferometer configured as shown above will be described.

Signal light is divided into two portions of a TE signal and a TM signal through a polarization beam splitter provided outside, which are inputted to the 90° hybrid interferometer independently of each other and local light is also inputted.

The TE signal is inputted to optical coupler 10a and optical coupler 10a branches the inputted TE signal and outputs the first TE signal and the second TE signal. The first TE signal outputted from optical coupler 10a is inputted to optical coupler 30a and the second TE signal outputted from optical coupler 10a is inputted to optical coupler 30b. The first TE signal inputted to optical coupler 30a and second TE signal inputted to optical coupler 30b are in-phase to each other since optical coupler 10a makes up an equal arm-length MZI interferometer.

The TM signal is inputted to optical coupler 10b and optical coupler 10b branches the inputted TM signal and outputs the first TM signal and the second TM signal. The first TM signal outputted from optical coupler 10b is inputted to optical coupler 30d and the second TM signal outputted from optical coupler 10b is inputted to optical coupler 30c. The first TM signal inputted to optical coupler 30d and the second TM signal inputted to optical coupler 30c are in-phase to each other since optical coupler 10b makes up an equal arm-length MZI interferometer.

The local light is branched into two portions, which are inputted to optical couplers 20a and 20b respectively. Optical couplers 20a and 20b branch the inputted local light, output the first and second local light, and input the branched local light to optical couplers 30a to 30d respectively. Since the waveguide length from optical coupler 20a to optical coupler 30b is longer than the waveguide length from optical coupler 20a to optical coupler 30a by π/2, the second local light outputted from optical coupler 20a and inputted to optical coupler 30b is shifted in phase by π/2 with respect to the first local light outputted from optical coupler 20a and inputted to optical coupler 30a. Furthermore, since the waveguide length from optical coupler 20b to optical coupler 30c is longer than the waveguide length from optical coupler 20b to optical coupler 30d by π/2, the second local light outputted from optical coupler 20b and inputted to optical coupler 30c is shifted in phase by π/2 with respect to the first local light outputted from optical coupler 20b and inputted to optical coupler 30d.

Here, the waveguide of the second TE signal outputted from optical coupler 10a, that is, the waveguide from optical coupler 10a to optical coupler 30b intersects the waveguide of the first local light outputted from optical coupler 20a, that is, the waveguide from optical coupler 20a to optical coupler 30a and the waveguide of the second TM signal outputted from optical coupler 10b, that is, the waveguide from optical coupler 10b to optical coupler 30c intersects the waveguide of the first local light outputted from optical coupler 20b, that is, the waveguide from optical coupler 20b to optical coupler 30d, resulting in waveguide intersections 40, and if nothing is done, intersection loss occurs in one of the waveguides making up the interferometer, which may cause the extinction ratio to degrade.

Therefore, in the present exemplary embodiment, the waveguide of the first TE signal outputted from optical coupler 10a, that is, the waveguide from optical coupler 10a to optical coupler 30a, the waveguide of the second local light outputted from optical coupler 20a, that is, the waveguide from optical coupler 20a to optical coupler 30b, the waveguide of the second local light outputted from optical coupler 20b, that is, the waveguide from optical coupler 20b to optical coupler 30c and the waveguide of the first TM signal outputted from optical coupler 10b, that is, the waveguide from optical coupler 10b to optical coupler 30d are provided with loss compensation intersecting waveguides 50a to 50d respectively. Loss compensation intersecting waveguides 50a and 50b intersect the waveguide of the first TE signal outputted from optical coupler 10a, that is, the waveguide from optical coupler 10a to optical coupler 30a and the waveguide of the second local light outputted from optical coupler 20a, that is, the waveguide from optical coupler 20a to optical coupler 30b at the same angle as the intersecting angle between the waveguide of the second TE signal outputted from optical coupler 10a, that is, the waveguide from optical coupler 10a to optical coupler 30b and the waveguide of the first local light outputted from optical coupler 20a, that is, the waveguide from optical coupler 20a to optical coupler 30a. Thus, the same intersection loss occurs on two waveguides making up an interferometer; the waveguide of the TE signal outputted from optical coupler 10a and the waveguide of the local light outputted from optical coupler 20a, and it is thereby possible to realize a high extinction ratio. Furthermore, loss compensation intersecting waveguides 50c and 50d intersect the waveguide of the second local light outputted from optical coupler 20b, that is, the waveguide from optical coupler 20b to optical coupler 30c and the waveguide of the first TM signal outputted from optical coupler 10b, that is, the waveguide from optical coupler 10b to optical coupler 30d at the same angle as the intersecting angle between the waveguide of the second TM signal outputted from optical coupler 10b, that is, the waveguide from optical coupler 10b to optical coupler 30c and the waveguide of the first local light outputted from optical coupler 20b, that is, the waveguide from optical coupler 20b to optical coupler 30d. Thus, the same intersection loss occurs on two waveguides making up an interferometer; the waveguide of the TM signal outputted from optical coupler 10b and the waveguide of the local light outputted from optical coupler 20b, and it is thereby possible to realize a high extinction ratio.

After that, the first TE signal outputted from optical coupler 10a and the first local light outputted from optical coupler 20a are coupled by optical coupler 30a and outputted to the PD output port.

Furthermore, the second TE signal outputted from optical coupler 10a and the second local light outputted from optical coupler 20a are coupled by optical coupler 30b and outputted to the PD output port.

Furthermore, the second TM signal outputted from optical coupler 10b and the second local light outputted from optical coupler 20b are coupled by optical coupler 30c and outputted to the PD output port.

Furthermore, the first TM signal outputted from optical coupler 10b and the first local light outputted from optical coupler 20b are coupled by optical coupler 30d and outputted to the PD output port.

Thus, in the present exemplary embodiment, there is waveguide intersection 40 where the waveguide of the second TE signal outputted from optical coupler 10a intersects the waveguide of the first local light outputted from optical coupler 20a and there is also waveguide intersection 40 where the waveguide of the second TM signal outputted from optical coupler 10b intersects the waveguide of the first local light outputted from optical coupler 20b, but since the waveguide of the first TE signal outputted from optical coupler 10a, the waveguide of the second local light outputted from optical coupler 20a, the waveguide of the second local light outputted from optical coupler 20b and the waveguide of the first TE signal outputted from optical coupler 10b are provided with loss compensation intersecting waveguides 50a to 50d respectively, the 90° hybrid interferometer in which two waveguides intersect each other can compensate for loss that occurs when the waveguides intersect each other and realize a high extinction ratio.

A 90° hybrid interferometer has been described in the present exemplary embodiment as an example of the optical mixer, but the optical mixer of the present invention is also likewise effective for an interferometer in which intersections are introduced.

While a preferred embodiment of the present invention has been described using specific terms, such description is for illustrative purposed only, and it is to be understood that changes and variations may be made without departing from the spirit or scope of the following claims.

What is claimed is:

1. An optical mixer comprising:
a first optical coupler that receives signal light, branches the signal light and outputs first and second signal light;
a second optical coupler that receives local light, branches the local light and outputs first and second local light;
a third optical coupler that couples the first signal light outputted from the first optical coupler with the first local light outputted from the second optical coupler and outputs the coupled light; and
a fourth coupler that couples the second signal light outputted from the first optical coupler with the second local light outputted from the second optical coupler and outputs the coupled light,
at least one of waveguide lengths of the first and second signal light and waveguide lengths of the first and second local light being longer or shorter than other waveguide lengths by π/2 and the waveguide from the first optical coupler to the fourth optical coupler intersecting the waveguide from the second optical coupler to the third optical coupler,
wherein the waveguide from the first optical coupler to the third optical coupler and the waveguide from the second optical coupler to the fourth optical coupler are each provided with loss compensating means for compensating for loss that occurs when the waveguide from the first optical coupler to the fourth optical coupler intersects the waveguide from the second optical coupler to the third optical coupler.

2. The optical mixer according to claim 1, wherein the loss compensating means each intersect a waveguide from the first optical coupler to the third optical coupler and a waveguide from the second optical coupler to the fourth optical coupler at an angle equal to an intersecting angle between a waveguide from the first optical coupler to the fourth optical coupler and a waveguide from the second optical coupler to the third optical coupler.

* * * * *